(No Model.)

2 Sheets—Sheet 1.

G. A. BACHMANN.
CENTRIFUGAL FILTERING MACHINE.

No. 544,080.

Patented Aug. 6, 1895.

Fig: 1.

WITNESSES:

INVENTOR
Gustav A. Bachmann
BY
ATTORNEYS.

(No Model.) 2 Sheets—Sheet 2.

G. A. BACHMANN.
CENTRIFUGAL FILTERING MACHINE.

No. 544,080. Patented Aug. 6, 1895.

WITNESSES:
J. Nussblatt
Geo. L. Wheelock

INVENTOR
Gustav A. Bachmann
BY
Sowell & Raegener
ATTORNEYS.

UNITED STATES PATENT OFFICE.

GUSTAV A. BACHMANN, OF NEWARK, ASSIGNOR OF ONE-FOURTH TO CHARLES R. MYERS, OF ATLANTIC CITY, NEW JERSEY.

CENTRIFUGAL FILTERING-MACHINE.

SPECIFICATION forming part of Letters Patent No. 544,080, dated August 6, 1895.

Application filed July 21, 1894. Serial No. 518,166. (No model.)

*To all whom it may concern:*

Be it known that I, GUSTAV A. BACHMANN, a citizen of the German Empire, residing at Newark, in the county of Essex and State of New Jersey, have invented certain new and useful Improvements in Centrifugal Filtering-Machines, of which the following is a specification.

This invention relates to an improved apparatus for filtering liquids under pressure by means of centrifugal power in such a manner that not only bodies which are specifically heavier than the liquid, but also bodies which are specifically lighter can be separated in a very effective and reliable manner, while the apparatus as well as the filtering material used in the same can be readily and quickly cleaned of the impurities separated from the liquid passed through the apparatus, so that the latter is quickly changed again into condition for the next filtering action.

The invention consists of a centrifugal filtering apparatus, which comprises a closed rotary bowl, a hollow axial shaft for said bowl, a flaring and tapering supply-channel at the bottom of the bowl, a cylindrical partition extending from the lower part of the bowl to a point near the top of the bowl, a cylindrical screen inside of said partition, and a conical distributer the apex of which is in line with the axis of the hollow shaft.

The invention consists, further, of the combination, with the upper end of the hollow shaft, of a collecting-receptacle, a radially-perforated discharge-nozzle inside of said receptacle, and a discharge-pipe below said nozzle.

The invention consists, lastly, of certain details of construction, which will be fully set forth hereinafter and finally defined in the claims.

Figure 1:
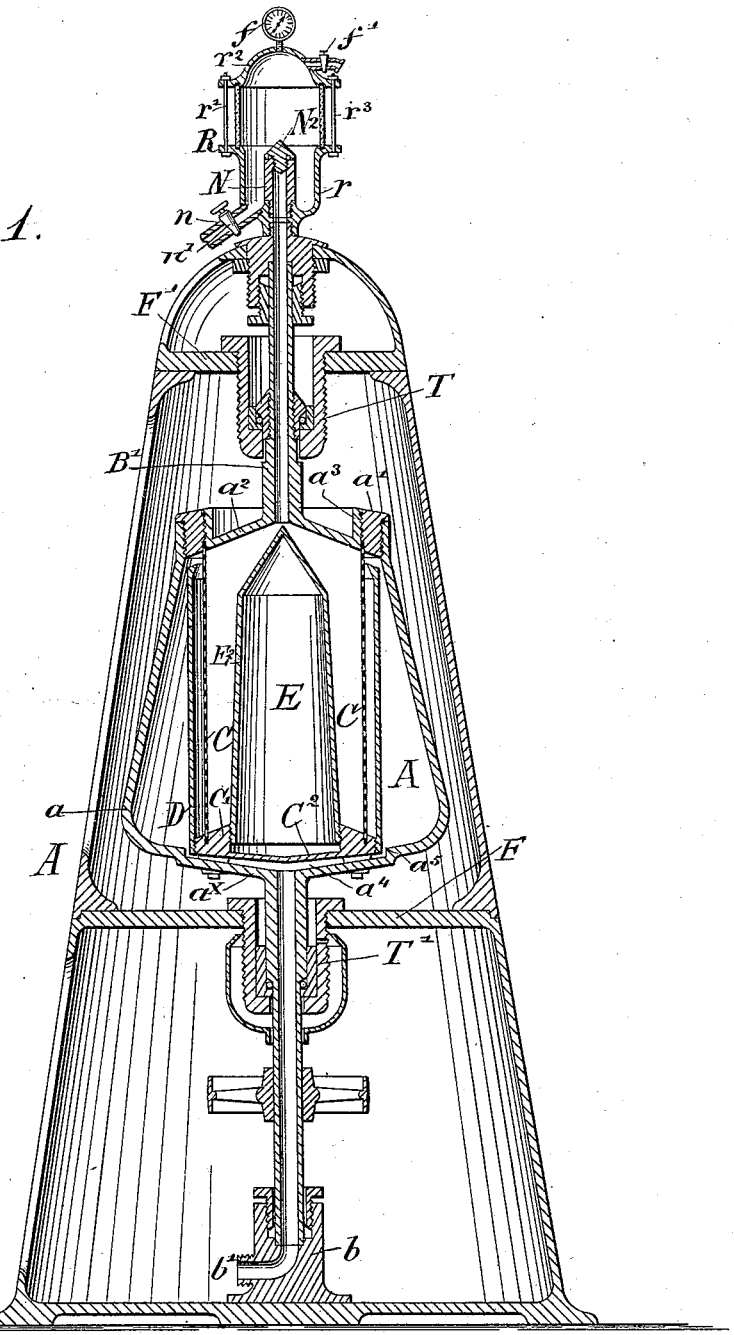
Figure 2:
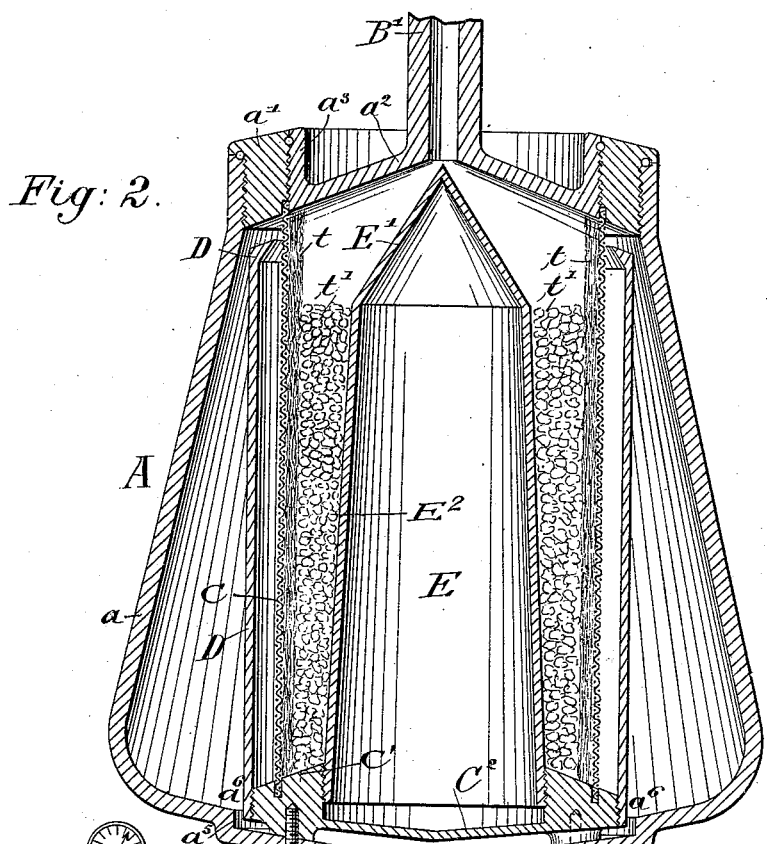
Figure 3:
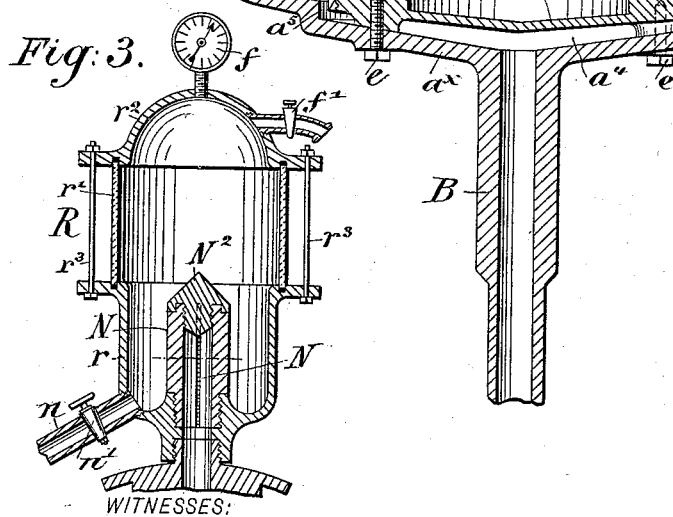
Figure 4:
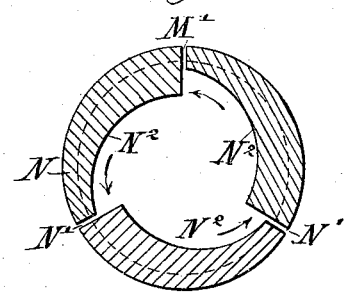

In the accompanying drawings, Figure 1 represents a vertical central section of my improved centrifugal filtering-machine by which my improved filtering process is carried out. Fig. 2 is a vertical central section of the rotary bowl of the apparatus drawn on a larger scale; and Figs. 3 and 4 are, respectively, a vertical central section of the speed-reducing receptacle and a horizontal section of the delivery-nozzle in the same, the latter figures being drawn on a larger scale.

Similar letters of reference indicate corresponding parts.

Referring to the drawings, A represents the bowl of my improved centrifugal filtering apparatus. This bowl is made of metal of suitable thickness, so that the same is capable of resisting a pressure of, say, about twenty-five pounds to the square inch and a speed up to five thousand rotations per minute.

Every part of the apparatus is connected with the exterior shell-like frame A', so that the apparatus forms a strong and substantial structure, in which every individual part can be subjected to the highest speed which is imparted to the rotary bowl A.

The rotary bowl A may be made of any suitable form, either tapering in upward direction or cylindrical, but in all cases it is necessary that the same be closed hermetically against the atmosphere. The rotary bowl A is made of three parts, the bottom and main portion $a$ of which are made in one piece and provided with an interior screw-thread at the upper end, a ring-shaped connecting portion $a'$, which is provided with an interior and an exterior screw-thread, and a top portion $a^2$, which is provided with a circumferential flange $a^3$, having an exterior screw-thread, and with a tubular shaft B' that extends centrally from the same. The bottom of the rotary bowl A is likewise provided with a tubular shaft B, said shaft B B' turning in suitable ball-bearings T T', of any approved construction, which are arranged in the supporting-frame A'. The supporting-frame A' is connected at its lower end and at the intermediate points where the ball-bearings are arranged with suitable stiffening-frames F F', so as to impart the required strength and rigidity to the supporting-frame A'. The ball-bearinge are supplied with suitable lubricating devices, so that the friction of the tubular shaft B B' in the ball-bearings is diminished and the easy motion of the centrifugal bowl obtained. The lower end of the tubular shaft B is supported in a step-bearing $b$, which is provided with a supply-channel $b'$, to which a suitable supply-pipe is connected by a screw-coupling. (Not shown.) Rotary motion is imparted to the shaft B B' by a suitable belt-and-pulley transmission. The upper end of the shaft B' is connected with a nozzle N in a speed-reducing receptacle R that extends around the nozzle, and which is provided with an outlet-pipe $n$, from which the filtered liquid is conducted off to suitable vessels.

To the bottom of the rotary bowl A is connected by suitable screws $e$ an interior collar C' having interior and exterior screw-threads. This collar is made flaring at its lower diaphragm-like end $C^2$, so as to form with the flaring central portion $a^x$ of the bowl A a thin slightly-flaring channel $a^4$ of conical shape, which terminates in a shoulder $a^5$, that is formed in the bottom and which extends concentrically to the threaded interior collar C'. At the inside of the bowl A is screwed to the exterior thread of the collar C' a cylindrical partition D, which extends to near the upper end of the rotary bowl A and is provided with a slightly-upwardly-flaring edge D', as shown in Fig. 2. The upper edge of the partition D may be arranged at a very short distance from the upper edge of the bowl A, a separating-space of a one-thirty-second part of an inch being sufficient for practical purposes. In a groove of the collar C' and of the upper collar $a'$ is retained at the inside of the cylindrical partition D a cylindrical wire screen C, which divides the rotary bowl into two parts, an exterior and an interior compartment. At the center of the bowl A is arranged a hollow conical distributer E, which is screwed at its lower end into the collar C', and the apex of which is in line with the axis of the tubular shaft B B'. This distributer E may be either formed with a conical tapering upper portion E' and a less tapering lower portion $E^2$, or it may be made conical from its base to its apex, as desired, the degree of conicalness being immaterial.

In constructing the bowl A care must be taken that the area of the annular opening $a^6$, formed between the lower part of the partition D and the shoulder $a^5$ in the bottom part of the apparatus, be not larger than the cross-sectional area of the supply-opening in the lower shaft-section B, so that a uniform quantity of liquid is continuously supplied from the tubular shaft B into the rotary bowl A of the apparatus. The shoulder $a^5$ also changes the direction of motion of the liquid supplied through the tubular shaft B, and compels the same to move in upward direction along the inner surface of the main portion $a$ of the rotary bowl A until it arrives at the upper end, it filling gradually the outer annular compartment between the main portion $a$ and the partition D, passing then over the upper edge of the latter into the space between the partition D and the screen C, and through the screen along the surface of the distributer E and the inner surface of the top $a^2$ of the bowl A into the upper tubular shaft B', being thence conducted through the lateral openings N' in the nozzle N into the speed-reducing receptacle R, from which it flows off into the receiving-receptacles through discharge-pipe $n$, which can be controlled by a cock $n'$.

The nozzle N is clearly shown in detail section in Fig. 4, and is provided with radial slits or openings N', which communicate by means of eccentrically-curved interior surfaces $N^2$ with the next opening in the nozzle N, so that the body of the liquid is compelled to rotate in the nozzle in the direction of the arrows shown in Fig. 4, while some of it flows off continuously through the radial openings N' into the receptacle R. The upper end of the nozzle is closed by a pointed plug $N^3$, which is nearly on a level with the upper edge of the bottom part of the receptacle, which bottom is made of approximately-inverted bell-shape, while the middle portion $r'$ is made of a glass cylinder that is tightly fitted into a groove in the bottom part $r$ and the rounded-off top $r^2$, and connected firmly with the same by means of connecting-rods $r^3$, as shown in Fig. 3. The top part of the receptacle is provided with a pressure-gage $f$ and with an air-valve $f'$. The filtered liquid arrives, while being rapidly rotated, in the interior space of the nozzle N, and is continuously discharged through the openings in the same in radial direction into the speed-reducing receptacle R, in which the pressure is reduced and the liquid prevented from being discharged under too great a head.

Before the liquid to be filtered is passed into the centrifugal apparatus it is preferable to first filter the same in any approved device, by means of which the coarser impurities are retained—such as small pieces of wood, pitch, tallow, fibers, &c.—as these would tend to choke some of the supply-openings of the centrifugal apparatus and impair thereby the proper working of the same.

Before the filtering of the liquid can take place the apparatus must be supplied while being rotated with the required quantity of filtering material, which is accomplished as follows: A quantity of water sufficient to fill the rotary bowl A is mixed in a suitable vessel with fibers—such as asbestos fibers, cellulose, &c.—and then transferred under pressure into the speed-receptacle R through the radial openings in the nozzle N and through the upper shaft B' into the interior of the bowl A until it fills up entirely the space between the distributer E and the partition D, the supply being continued until the water is discharged at the lower end of the lower shaft B. The bowl A is then set in rotation and gradually the rest of the fibers supplied. Owing to the centrifugal force a uniform layer $t$ of fibers is firmly pressed against the inner surface of the screen C, while the water passes along near the wall of the partition D into the space between the same and the bowl A, and through the flaring space between the inner and outer bottom portions into the lower shaft B and to the outside. This layer is next cleaned by supplying a quantity of water in the same manner and forcing the same through the apparatus, as before described, until the water passes off perfectly clear, it having thereby removed all the impurities contained in the apparatus and in the fibers. After this is accomplished another quantity of water, which is mixed with pure white sand, small glass, pearls, shot, or other material, is then introduced into the apparatus in the same manner as the mixture of water and fibers which was introduced before, while the apparatus is kept in continual motion, the sand or other material forming a second layer $t'$ that covers the layer of fibers on the screen when pressed by the centrifugal force firmly against the filtering fibers, so as to hold them in position, but which falls into the bottom of the space between the distributer E and screen C when the apparatus is at rest. The pressure of the layer of sand, shot, &c., against the layer of fibers is so great, when the bowl is rotated, that by reason of the centrifugal force the fibers are packed firmly together, so that they will cling to the rough inner surface of the screen in the form of a layer $t$ after the motion of the apparatus has ceased. The layers $t$ $t'$ are shown only in Fig. 2, Fig. 1 showing the bowl before the filtering material has been forced in. After the sand has been introduced into the apparatus water is again supplied, so as to clean the same. The water-supply is then interrupted, and the apparatus is permitted to rotate for some time until all the water is separated from the sand and fibers. The speed of the apparatus is gradually reduced and the same permitted to remain at rest for a few minutes, so that the water can quickly run off from the same. It is then ready for the filtering process, for which purpose it is connected with the supply liquid, which liquid, passing into the bowl A from the shaft B, is subjected to a pressure of carbonic-acid gas of about ten pounds to the square inch, and when in the bowl it is subjected to full speed—namely, about twenty-five hundred rotations per minute. Before the liquid is supplied to the bowl both cocks $f'$ $n'$ are closed, so that the liquid can pass under pressure of the carbonic-acid gas through the apparatus. As soon as the gage indicates a pressure of from eight to ten pounds, the air-cock $f'$ is opened, so as to permit the reduction of pressure until the glass cylinder of the speed-reducing receptacle is entirely filled with liquid. The air-cock $f'$ is then closed and the cock $n'$ in the discharge-pipe $n$ opened, so that the filtered liquid can be conducted off. As the liquid passes through the apparatus under the exclusion of atmospheric air and under pressure of carbonic acid there is hardly any loss of gas. Any suitable carbonic-acid-gas pressure apparatus may be used, as is evident without detailed illustration.

Carbonated liquids have to be subjected to a pressure in the speed-reducing receptacle, so as to retain the gas, while still liquids require no pressure in the same. This counter-pressure is obtained in such a manner that the discharge is regulated, while the full pressure is placed on the supply-opening.

The course of the liquid through the apparatus is as follows: It is introduced to the flaring space at the bottom $a^4$ and deflected by the annular shoulder $a^5$ in the bottom, passing then along the inner surface of the rotary bowl until it arrives at the upper end of the same, filling then the space between the interior cylindrical partition and the inner surface of the bowl, and then passing over the upper inclined edge of the cylindrical partition into the space between the same and the screen. As soon as the entire space between the cylindrical portion and the screen is filled the liquid passes through the screen and the layers of filtering material and sand on the same into the space between the screen and the distributer and passes then over the surface of the same and along the inclined inner surface of the top part $a^2$ of the bowl A into the tubular shaft B'. The centrifugal force is such that the pressure of the liquid in passing through the filtering material cannot overcome the clinging tendency of the latter against the screen, and hence the fibrous material remains in position on the inner surface of the screen. The bodies which are specifically heavier than the liquid are retained by this process on the inner surface of the bowl A and on the inner surface of the cylinder D, while the bodies which are specifically lighter than the liquid are retained in the meshes of the screen C, as the layers of fibrous material and sand permit the passage of such bodies.

When the apparatus is to be cleaned, so as to remove the separated bodies from the same, it is permitted to rest, and water is supplied through the upper shaft B', carrying the separated impurities with it and conducting them off through the lower tubular shaft B. When the apparatus is cleaned in this manner, it is set in motion again, so that the water is removed from the apparatus, after which the same is ready for the next filtering action. The removing and exchanging of the sand, as well as of the filtering fibers, for a thorough cleaning of the apparatus, is only necessary after repeated use, and is accomplished in such a manner that while the apparatus is not in motion pure water is introduced under pressure to the lower shaft B and conducted off through the shaft B', whereby all the fibers and sand are collected and carried along through the discharge-pipes to the outside of the apparatus, where they are collected and either cleaned and reintroduced into the apparatus, or, preferably, new fibers and sand are introduced into the same, as before described. In this manner the effective filtration of fermented liquids containing carbonic-acid gas, as well as other liquids, is obtained, the fermented liquids being thereby freed of the yeast-cells and other impurities which impair the life of the same, and the filtering action being performed under pressure and under the exclusion of atmospheric air, so that no change in the liquid itself or in the gaseous contents of the same takes place.

Having thus described my invention, I claim as new and desire to secure by Letters Patent—

1. A centrifugal filtering-apparatus, consisting of a rotary bowl, provided with an annular bottom supply-channel, a lower tubular shaft, an upper tubular shaft, a partition in the bowl separated from the same at the upper end, a screen surrounded by said partition, and a distributer at the center of the bowl, substantially as set forth.

2. A centrifugal filtering-apparatus, consisting of a closed rotary bowl, tubular shafts at the top and the bottom of the bowl, an interior collar supported on the bowl and forming between it and the latter an annular supply-channel, a shoulder at the outer termination of said channel, a partition supported in the bowl, a screen also supported in the bowl inside of the partition, and a central distributer inside of the screen, substantially as set forth.

3. A centrifugal filtering-apparatus, consisting of a closed rotary bowl, tubular shafts arranged at the top and bottom of the bowl, an interior collar supported on the bottom of the bowl and forming an annular supply-channel, a shoulder at the outer end of the channel, a cylindrical partition attached to said collar and provided with an inwardly-flaring upper edge, a screen supported by the collar and the top of the bowl, and a central distributer inside of the screen, substantially as set forth.

4. The combination of a closed rotary bowl, provided with supply-channels, a partition in the same, a screen inside of the partition, a distributer at the center of the bowl, tubular shafts at the top and bottom of the bowl, a nozzle at the upper end of the upper shaft, said nozzle being provided with radial outlet-openings, and a speed-reducing receptacle surrounding said nozzle and provided with a valved discharge-pipe leading therefrom to the vessels to be filled, substantially as set forth.

In testimony that I claim the foregoing as my invention I have signed my name in presence of two subscribing witnesses.

GUSTAV A. BACHMANN.

Witnesses:
PAUL GOEPEL,
GEO. L. WHEELOCK.